(No Model.) 2 Sheets—Sheet 1.
C. C. SCHWANER.
PAD TREE AND HARNESS SADDLE.
No. 271,927. Patented Feb. 6, 1883.
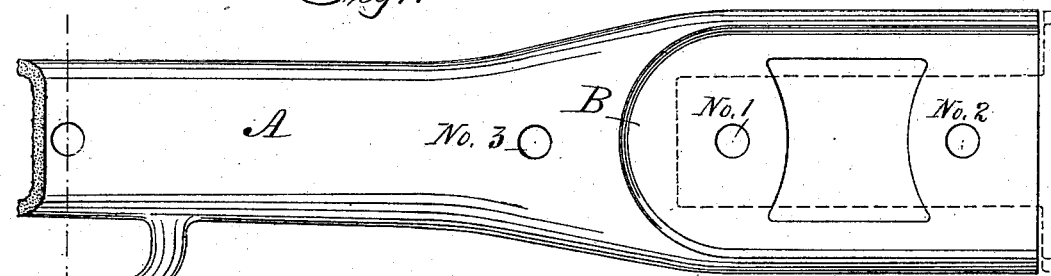
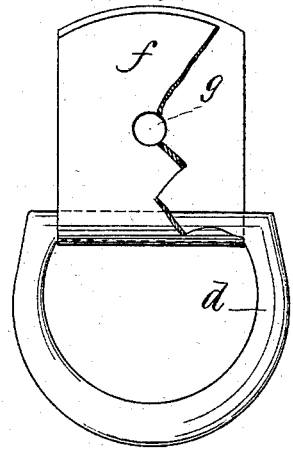
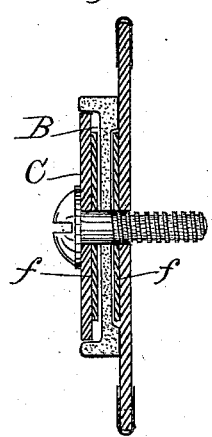
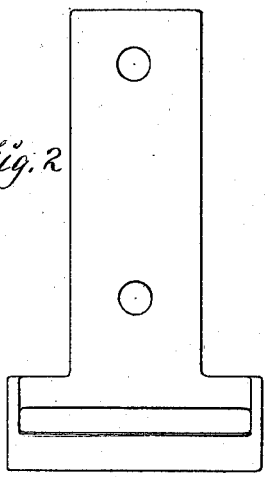
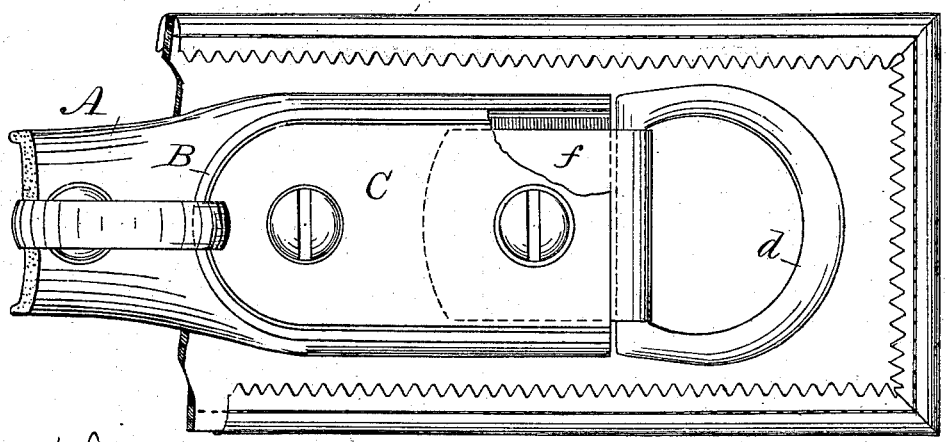
Witnesses:
H. A. Stoltenberg.
W. F. Gould
Inventor:
Christian C. Schwaner,
By Thomas G. Orwig, Attorney.

(No Model.) 2 Sheets—Sheet 2.

C. C. SCHWANER.
PAD TREE AND HARNESS SADDLE.

No. 271,927. Patented Feb. 6, 1883.

Witnesses:
H. A. Stoltenberg
W. F. Gould

Inventor:
Christian C. Schwaner,
By Thomas G. Orwig, Attorney.

UNITED STATES PATENT OFFICE.

CHRISTIAN C. SCHWANER, OF WINTERSET, IOWA, ASSIGNOR OF TWO-THIRDS TO H. J. B. CUMMINGS AND T. F. MARDI, OF SAME PLACE.

PAD-TREE AND HARNESS-SADDLE.

SPECIFICATION forming part of Letters Patent No. 271,927, dated February 6, 1883.

Application filed November 20, 1882. (No model.)

*To all whom it may concern:*

Be it known that I, CHRISTIAN C. SCHWANER, of Winterset, in the county of Madison and State of Iowa, have invented an Improved Pad-Tree and Harness-Saddle, of which the following is a specification.

My invention relates to the manner of combining loops to a pad-tree and harness-saddle. Different forms of loops are required on the lower ends of the saddle—one form adapted to allow the skirt to extend through the loops in such a manner that the skirts can bend to and from the horse, and also restrict the same skirts from any side movement or backward or forward motion relative to the saddle; and another form that is adapted to receive adjustable and detachable straps that connect shaft-carriers and the trace-buckles and traces with the saddle in such a manner that there will be a hinged connection that will allow the connecting-straps to swing to and from the horse, and also backward and forward relative to the horse and the harness-saddle on the horse.

Different forms of pad-trees have heretofore been required for connecting such different forms of loops therewith to produce such different kinds of harness; and my invention consists, first, in forming a pad-tree adapted for single and also for double harness, and combining such different loops interchangeably therewith; second, in washers or "jockeys" adapted to be combined with the pad-tree and saddle, all as hereinafter fully set forth.

Figure 6:
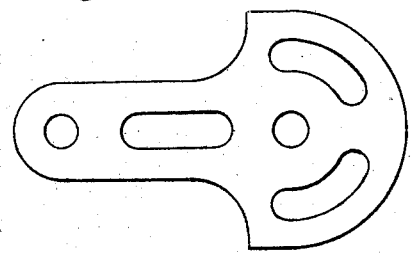
Figure 7:
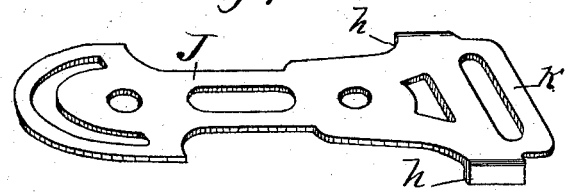
Figure 8:
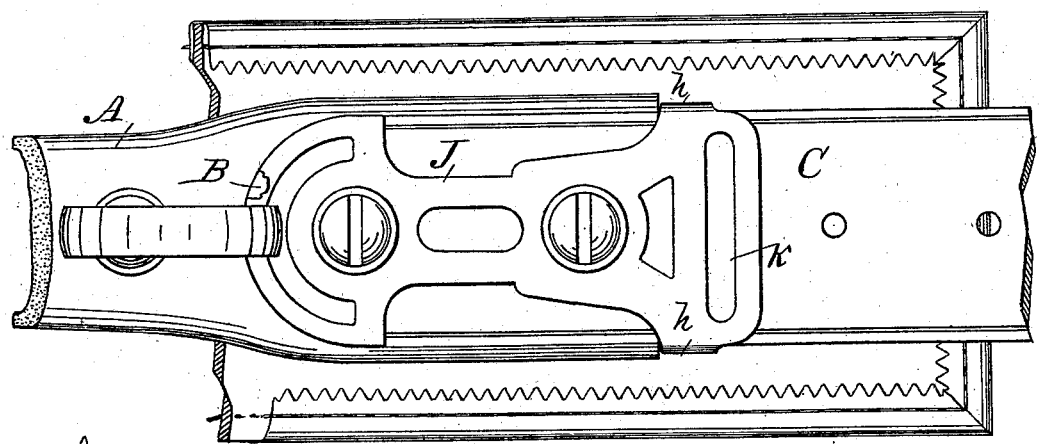

Figure 1 of my accompanying drawings represents one of my pad-trees broken off in its middle and center of the arch. Fig. 2 is a loop of common form, made complete in one piece and adapted to be used for double or single harness. Fig. 3 is a loop device in two parts adapted to be used as an attachment to my improved pad-tree. Fig. 4 shows the attachment and loop combined with my improved pad-tree and saddle. Fig 5 is a transverse section of Fig. 4. Figs. 6 and 7 represent ornamental metal plates and washers or jockeys adapted to be placed on top of the skirt and leather, and clamped thereto by means of the screws that clamp the different parts together. Fig. 8 shows one of my jockeys combined with the pad-tree and saddle. Jointly considered these figures clearly illustrate the construction and operation of my complete invention.

A represents the flat and wide ends of a metal pad-tree, formed complete in one piece by casting in a mold.

B is a panel formed in the top or outside of the part A to receive the top end of a leather skirt or leather cover, C, when the loop attachment is used, as shown in Fig. 4.

$d$ is a rigid D-shaped loop, and $f$ a flexible metal strap or clasp, having perforations in its ends, doubled over the straight bar of the loop to form a hinge.

In constructing a harness-saddle, I simply place the perforated shank of the loop (shown in Fig. 2) on the under side of the flattened end A of the pad-tree and the top end of a leather skirt, C, in the panel B on the outside of the pad-tree to extend downward through the loop, and then pass screws through the perforations Nos. 1 and 2, and the screw-shanks of terrets through the perforations No. 3 into nuts or screw-threaded plates fixed to the harness-pad.

To clamp the top end of the leather skirt in the panel B more securely, and to ornament the complete saddle, I place one of my jockey-plates, as represented in Fig. 8, on the top of the leather, and also in the panel of the pad-tree.

The lugs $h$, formed integral with the plate or jockey J, serve the purpose of a loop to restrict the skirt from slipping backward or forward on the pad and saddle; and the loop $k$, also formed integral with the plate J, serves as a means for attaching shaft carriers or straps to support the traces, so that the loop $d$ and clasp $f$ can be dispensed with when desired.

I am aware recesses have been formed in metal pad-trees to admit the ends of metal loops; but my manner of forming panels in the finished top surface of a pad-tree, and fitting the ends of leather skirt-pieces and ornamental plates in the panels to form a detachable connection between the loops and the pad-tree, and a complete harness-saddle adapted for single or double harness, is novel and greatly advantageous.

I claim as my invention—

1. A pad-tree having a finished top surface and panels B in its flat and widened end, and perforations 1 and 2 through the panel portions, adapting it to receive and retain the ends of leather skirt-pieces, and interchangeable loops and ornamental plates, in the manner set forth, for the purposes specified.

2. The ornamental plate or jockey J, having lugs h h at its sides and a loop, k, at its bottom, and adapted in form to fit in the panel B of a pad-tree, substantially as shown and described, for the purpose specified.

CHRISTIAN C. SCHWANER.

Witnesses:
  W. M. SHAW,
  E. H. KRIDLER.